(12) United States Patent
Jung

(10) Patent No.: US 7,728,869 B2
(45) Date of Patent: Jun. 1, 2010

(54) MATCHING CAMERA-PHOTOGRAPHED IMAGE WITH MAP DATA IN PORTABLE TERMINAL AND TRAVEL ROUTE GUIDANCE METHOD

(75) Inventor: Mun Ho Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 11/423,799

(22) Filed: Jun. 13, 2006

(65) Prior Publication Data

US 2007/0088497 A1 Apr. 19, 2007

(30) Foreign Application Priority Data

Jun. 14, 2005 (KR) ............... 10-2005-0051093
Jun. 14, 2005 (KR) ............... 10-2005-0051099
Jun. 23, 2005 (KR) ............... 10-2005-0054397

(51) Int. Cl.
H04N 7/00 (2006.01)
(52) U.S. Cl. .............. 348/113; 701/207; 348/231.2
(58) Field of Classification Search ............ 701/209; 348/113, 231.1, 231.2
See application file for complete search history.

(56) References Cited

U.S. PATENT DOCUMENTS

| 5,528,518 | A | * | 6/1996 | Bradshaw et al. ........... 702/150 |
| 5,742,521 | A | * | 4/1998 | Ellenby et al. ............. 702/127 |
| 5,815,411 | A | * | 9/1998 | Ellenby et al. ............. 702/150 |
| 5,825,480 | A | * | 10/1998 | Udagawa ................. 356/138 |
| 6,031,545 | A | * | 2/2000 | Ellenby et al. ............. 345/632 |
| 6,080,063 | A | * | 6/2000 | Khosla .................... 463/42 |
| 6,133,947 | A | * | 10/2000 | Mikuni ................... 348/143 |
| 6,208,353 | B1 | | 3/2001 | Ayer et al. |
| 6,222,583 | B1 | * | 4/2001 | Matsumura et al. ........ 348/113 |
| 6,285,317 | B1 | * | 9/2001 | Ong ..................... 342/357.13 |
| 6,396,475 | B1 | * | 5/2002 | Ellenby et al. ............. 345/156 |
| 6,442,476 | B1 | * | 8/2002 | Poropat .................. 701/207 |
| 6,452,544 | B1 | * | 9/2002 | Hakala et al. ........... 342/357.13 |
| 6,477,260 | B1 | * | 11/2002 | Shimomura .............. 382/106 |
| 6,690,370 | B2 | * | 2/2004 | Ellenby et al. ............. 345/419 |
| 6,741,864 | B2 | * | 5/2004 | Wilcock et al. ........... 455/456.1 |

(Continued)

FOREIGN PATENT DOCUMENTS

CN 1203369 12/1998

(Continued)

*Primary Examiner*—Mark Hellner
*Assistant Examiner*—Helal A Algahaim
(74) *Attorney, Agent, or Firm*—Lee, Hong, Degerman, Kang & Waimey

(57) ABSTRACT

The present invention relates to matching a camera-photographed image with map data in a portable terminal. Location information of objects of images photographed by a camera and location information of display objects, such as a building included in the map data are calculated based on location information of the camera, and the calculated location information is used to match the objects with the display objects. The image photographed by the camera is displayed on a screen, and text information of display objects matched to the objects is read out from the map data and is displayed on the locations of the objects displayed on the screen. If a user moves, a travel route is guided using the matching information between the objects and display objects, so the user can be guided with the travel route while personally checking objects such as a building.

15 Claims, 8 Drawing Sheets

U.S. PATENT DOCUMENTS

| | | | |
|---|---|---|---|
| 6,765,569 B2 * | 7/2004 | Neumann et al. | 345/419 |
| 6,775,614 B2 * | 8/2004 | Kim | 701/213 |
| 6,791,492 B2 * | 9/2004 | Miyasaka et al. | 342/357.13 |
| 6,885,939 B2 * | 4/2005 | Schmidt et al. | 701/211 |
| 6,940,538 B2 * | 9/2005 | Rafey et al. | 348/157 |
| 7,027,823 B2 * | 4/2006 | Mikuni | 455/457 |
| 7,088,389 B2 * | 8/2006 | Shibasaki et al. | 348/239 |
| 7,187,401 B2 * | 3/2007 | Alhadef et al. | 348/42 |
| 7,363,151 B2 * | 4/2008 | Nomura et al. | 701/208 |
| 7,627,420 B2 * | 12/2009 | Ujino | 701/200 |
| 2001/0017668 A1 * | 8/2001 | Wilcock et al. | 348/552 |
| 2002/0085111 A1 * | 7/2002 | Heiman | 348/333.01 |
| 2002/0140745 A1 * | 10/2002 | Ellenby et al. | 345/848 |
| 2003/0132935 A1 * | 7/2003 | Ellenby et al. | 345/419 |
| 2006/0142943 A1 * | 6/2006 | Park | 701/213 |
| 2006/0155466 A1 | 7/2006 | Kanda et al. | |
| 2006/0158534 A1 * | 7/2006 | Gotohda | 348/239 |
| 2006/0190812 A1 * | 8/2006 | Ellenby et al. | 715/512 |
| 2008/0195315 A1 * | 8/2008 | Hu et al. | 701/212 |

FOREIGN PATENT DOCUMENTS

| | | |
|---|---|---|
| EP | 0 406 946 A1 | 1/1991 |
| EP | 0 867 690 A1 | 9/1998 |
| GB | 2 421 653 A | 12/2004 |
| JP | 09 033271 A | 2/1997 |
| JP | 09033271 | 2/1997 |

* cited by examiner

MATCHING CAMERA-PHOTOGRAPHED IMAGE WITH MAP DATA IN PORTABLE TERMINAL AND TRAVEL ROUTE GUIDANCE METHOD

CROSS-REFERENCE TO RELATED APPLICATIONS

Pursuant to 35 U.S.C. §119(a), this application claims the benefit of earlier filing date and right of priority to Korean Application No. 10-2005-0051093, filed on Jun. 14,2005, Korean Application No. 10-2005-0051099, filed on Jun. 14,2005, and Korean Application No. 10-2005-0054397, filed on Jun. 23,2005, the contents of which are hereby incorporated by reference herein their entirety.

FIELD OF THE INVENTION

The present invention relates to a method for matching a camera-photographed image with map data in a portable terminal. The present invention also relates to a travel route guidance method using the camera-photographed image in the portable terminal.

BACKGROUND OF THE INVENTION

In a Global Positioning System (GPS), four or more GPS satellites per plane are positioned in six orbital planes with each GPS satellite crossing the equator of the Earth at an inclination angle of 55 degrees in order to maximize user coverage anywhere on the Earth's surface. Each GPS satellite circles the earth approximately every 12 hours to transmit navigation messages.

A GPS receiver receives the navigation messages periodically transmitted from at least four or more GPS satellites out of a plurality of GPS satellites. The GPS receiver detects a distance between the receiver and the GPS satellites, and a position vector (3D location coordinate) of the GPS satellites to calculate its position vector.

In a navigation system equipped with the GPS receiver, the position vector detected by the GPS receiver is map-matched on a digital map to be displayed on a display screen. As a value-added service, the navigation system provides a travel route guidance service notifying a user's current position or a travel route from a starting point to a destination. Accordingly, the user of the navigation system can easily find a destination from a starting point or a current location by receiving the travel route guidance service of the navigation system.

Recently, navigation systems have been mounted to various mobile terminals, such as a portable terminal, a personal digital assistance (PDA), an iBook phone, and a smart phone. Hereinafter, the mobile terminal is simply referred to as a portable terminal for convenience. Thus, a user can be guided by a travel route to a destination even if the user walks to the destination on foot.

If a user of a portable terminal equipped with a navigation system is provided with a service for guiding the user to a predetermined destination on a travel route, the user typically has to check for an actual object on the street to correspond to an object displayed on a digital map on a display of the portable terminal.

In this case, the user has to visually check and match one-by-one the object on the map with the actual object on the street. For example, the user would have to match a building that he or she actually sees on the street with that shown on the digital map to make sure that a prescribed building ("A") displayed on the screen is identical to an actual building. Thereafter, discrimination is made as to which building on the map actually corresponds to the building "A" on the screen.

Particularly, if an object building is located far away from a current location of a user, the user has to personally move to a location of the object building in order to obtain information of the object building. By moving to the location of the object building, the user can confirm that the building wanted by him or her corresponds to the object building on the map only if the information obtained on the object building matches the building displayed on the map.

Furthermore, if a user moves to a destination by receiving a travel route via a navigation system disposed on a portable terminal, the navigation system typically displays a map on a screen and guides the user onto the travel route. As a result, the user has to find a destination by checking buildings on the map one-by-one with the actual object building on the street.

SUMMARY OF THE INVENTION

The present invention is directed to matching a camera-photographed image with map data in a portable terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for matching a camera-photographed image with map data in a portable terminal, the method comprising photographing at least one object with a camera disposed on a portable terminal, determining location information of the camera photographing the at least one object, calculating location information of the at least one object photographed, calculating location information of at least one display object included in the map data based on a current location of the camera, comparing the location information of the at least one object photographed to the location information of the at least one display object, and matching the at least one display object to the at least one object photographed based on their respective location information.

In one aspect of the invention, determining location information of the camera photographing the at least one object comprises determining a current location of the camera according to GPS messages received by a GPS receiver disposed on the portable terminal, determining an azimuth angle of a central axis of the camera using an azimuth sensor disposed on the portable terminal, and determining an inclination of the camera using an inclination sensor disposed on the portable terminal.

Preferably, the location information of the at least one object photographed and the location information of the at least one display object is calculated from the determined location information of the camera based on the current location of the camera and an azimuth angle of a central axis of the camera. Preferably, the location information of the camera comprises a current location of the camera and an azimuth angle of a central axis of the camera.

In another aspect of the invention, calculating location information of the at least one object photographed comprises extracting a contour from the at least object photographed, establishing a location information calculation point of the at least one object from the extracted contour, calculating an azimuth angle of the location information calculation point based on the azimuth angle of the central axis of the camera, and calculating a distance from the current location of the camera to the location information calculation point.

Preferably, extracting the contour from the at least one object is performed by capturing the at least one object photographed. Preferably, the location information of the camera further comprises an inclination of the camera. Preferably, calculating location information of the at least one object photographed further comprises correcting a calculated distance from the current location of the camera to the location information calculation point.

In a further aspect of the invention, calculating location information of at least one display object based on a current location of the camera comprises matching the location information of the camera to map data, establishing a location information calculation point of the at least one display object, and calculating location information of the location information calculation point of the at least one display object based on the location of the camera matched to the map data. Preferably, the location information of the camera comprises a current location of the camera and an azimuth angle of a central axis of the camera.

Preferably, calculating location information of the location information calculation point of the at least one display object comprises calculating a distance from the current location of the camera to the location information calculation point of the at least one display object, and calculating an azimuth angle of the location information calculation point based on the azimuth angle of the central axis of the camera.

Preferably, matching the at least one display object to the at least one object photographed is performed when an error value between the location information of the at least one object photographed and the location information of the at least one display object is within a predetermined value.

In yet another aspect of the invention, the method further comprises reading-out from map data text information of the at least one display object matched to the at least one object photographed, inserting the read-out text information into relevant locations within the at least one object photographed, and displaying the at least one object photographed having the read-out text information inserted therein.

Preferably, inserting the read-out text information into relevant locations within the at least one object photographed comprises determining a display location of the text information at a location of the at least one object photographed matched to the at least one display object, and mapping the text information of the at least one display object at the determined display location.

Preferably, displaying the at least one object photographed having the read-out text information inserted therein comprises determining a display color, and displaying a contour of the at least one object photographed and the text information by the determined display color.

In accordance with another embodiment of the present invention, a travel route guidance method using a camera-photographed image in a portable terminal comprises searching for a travel route from a starting point to a destination using map data stored in the portable terminal, determining location information of a camera disposed at the portable terminal, matching at least one display object included in the map data to at least one object photographed by the camera, determining a guidance object in the at least one object photographed by the camera, inserting a guidance object icon at a location of the guidance object determined by the at least one object photographed, displaying the guidance object icon on a screen of the portable terminal, and guiding the travel route.

In one aspect of the invention, determining location information of a camera disposed at the portable terminal comprises determining a current location of the camera according to GPS messages received by a GPS receiver disposed on the portable terminal, determining an azimuth angle of a central axis of the camera using an azimuth sensor disposed on the portable terminal, and determining an inclination of the camera using an inclination sensor disposed on the portable terminal.

In another aspect of the invention, matching at least one display object included in the map data to at least one object photographed by the camera comprises calculating location information of the at least one object photographed, calculating location information of at least one display object included in the map data, comparing the calculated location information of the at least one object photographed to the calculated location information of the at least one display object, and matching the at least one display object to the at least one object photographed based on their respective location information.

Preferably, the location information of the at least one object photographed and the at least one display object included in the map data are calculated based on location information of the camera. Preferably, the location information of the camera comprises a current location of the camera and an azimuth angle of a central axis of the camera.

In a further aspect of the invention, calculating location information of the at least one object photographed comprises extracting a contour from the at least object photographed, establishing a location information calculation point of the at least one object from the extracted contour, calculating an azimuth angle of the location information calculation point based on the azimuth angle of the central axis of the camera, and calculating a distance from a current location of the camera to the location information calculation point.

Preferably, the location information of the camera further comprises an inclination of the camera. Preferably, calculating location information of the at least one object photographed further comprises correcting a calculated distance from the current location of the camera to the location information calculation point.

In yet another aspect of the invention, calculating location information of at least one display object included in the map data comprises matching the location information of the camera to the map data, establishing a location information calculation point of the at least one display object, and calculating location information of the location information calculation point of the at least one display object based on the location of the camera matched to the map data.

Preferably, the location information of the camera comprises a current location of the camera and an azimuth angle of a central axis of the camera. Preferably, calculating location information of the location information calculation point of the at least one display object comprises calculating a distance from the current location of the camera to the location information calculation point of the at least one display object, and calculating an azimuth angle of the location information calculation point based on the azimuth angle of the central axis of the camera.

Preferably, matching the at least one display object to the at least one object photographed is performed when an error value between the location information of the at least one object photographed and the location information of the at least one display object is within a predetermined value.

In still another aspect of the invention, the method further comprises reading-out from map data text information of the at least one display object matched to the at least one object photographed, inserting the read-out text information into relevant locations within the at least one object photographed, and displaying the at least one object photographed having the read-out text information inserted therein.

Preferably, inserting the read-out text information into relevant locations within the at least one object photographed comprises determining a display location of the text information at a location of the at least one object photographed matched to the at least one display object, and mapping the text information of the at least one display object at the determined display location.

Preferably, displaying the at least one object photographed having the read-out text information inserted therein comprises determining a display color, and displaying a contour of the at least one object photographed and the text information by the determined display color.

Preferably, determining a guidance object comprises determining whether an object existing in the at least one object photographed is available as a destination, determining the object existing in the at least one object photographed as the guidance object if the object existing in the at least one object photographed is determined to be available as the destination, and selecting one object existing on the travel route from the at least one object photographed and determining the selected object as the guidance object if no object is determined to be available as the destination.

Preferably, displaying the guidance object icon on a screen of the portable terminal comprises displaying a particular guidance object icon according to whether the object determined as the guidance object is the destination or not.

It is a first object of the present invention to provide a method for matching a camera-photographed image with a map data in a portable terminal by which objects such as a building and the like are photographed by a camera disposed on the portable terminal and the objects in photographed images are matched with display objects on a map data.

A second object is to provide a method for matching a camera-photographed image with a map data in a portable terminal by which text information of display objects are displayed on a screen along with photographed images of a camera if the objects in photographed images match the display objects on the map data.

A third object is to provide a travel route guidance method using a camera-photographed image in the portable terminal by which display objects on a map data are matched to objects in photographed images, and a travel route from a current location of a user to a destination is guided by using the photographed images of a camera.

A fourth object is to provide a travel route guidance method using a camera-photographed image in the portable terminal by which text information of display objects on a map data that is matched to objects of photographed images are displayed on a screen along with the camera-photographed images to guide a travel route when the travel route of a user is guided.

Location information discrimination of the camera is performed in such a manner that a GPS receiver receives navigation messages and determines a location discriminated by the received navigation messages as a current location of the camera, and an azimuth angle and an inclination detected by a sensor determine an azimuth angle and an inclination of a central axis photographed by the camera.

Furthermore, based on the location information discriminated by the camera, location information of at least one object existing in the photographed images and location information of display objects included in the map data are calculated, and the at least one object is matched to a display object having the identical location information.

Calculation of the location information of the at least one object is performed in such a manner that a contour of an object is extracted from the photographed images to separate at least one object, and a central point for calculating the location information from the separated object is set up. Then, the azimuth angle of the camera is used to calculate the central point for calculating the location information of the object, and a distance from the current location of the camera to the central point of the object is calculated.

The location information calculation of display objects included in the map data is performed in such a fashion that location information of the camera is matched to the map data to set up central points of the display objects. Then, location and an azimuth angle of the camera matched to the map data are used to calculate a distance between the camera and the respective display objects and azimuth angles.

The matching between the at least one object and the display object is performed in such a fashion that the location information of the at least one object is compared with the respective location information of the display objects, and as a result of the comparison, if an error between the two location information is within a predetermined range, a display object having an error within the predetermined range of location information is matched to the at least one object.

Furthermore, text information of the display object matched to the at least one object is read out from the map data, and the read-out text information is inserted into a location of the relevant object in which the display object is matched in the images thus photographed, and the information is displayed.

The insertion and display of the text information into the photographed image is performed in such a manner that a display location of text information is determined by the location of the object matched to the display object, and the text information of the display object is mapped onto the determined display location. Then, display colors are determined for displaying the object and the text information, and contour of the object and the text information are displayed by the determined display colors.

According to the third and fourth objects of the present invention, a starting point and a destination are determined, and a travel route from the starting point to the destination is searched by loading a map data. Objects are photographed by a camera if a user travels along the searched travel route, and at least one object in photographed images is matched to a display object included in the map data.

Furthermore, at least one object matched to a predetermined display object among the objects of the photographed images is determined as a guide object, and a guide object icon is inserted into a location of the determined guide object and is displayed on a screen to guide the travel route from the starting point to the destination.

The determination of the guide object is performed in such a manner that, if a destination exists in the photographed images, the destination is determined as a guide object. For example, if a predetermined building is inputted as a destination, discrimination is made as to whether a relevant building is available in the photographed images, and if the relevant building is available, the relevant building is determined as a guide object. If the destination does not exist in the photographed images, at least one object existing in the photographed images and located on the travel route, out of objects matching to the display objects, is selected and determined as a guide object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method for matching a camera-photographed image with a map data in a portable terminal and a travel route guidance method using the camera-photographed image in the portable terminal. The present invention will be explained with reference to the accompanying drawings exemplifying the preferred embodiment of the present invention.

Figure 1:
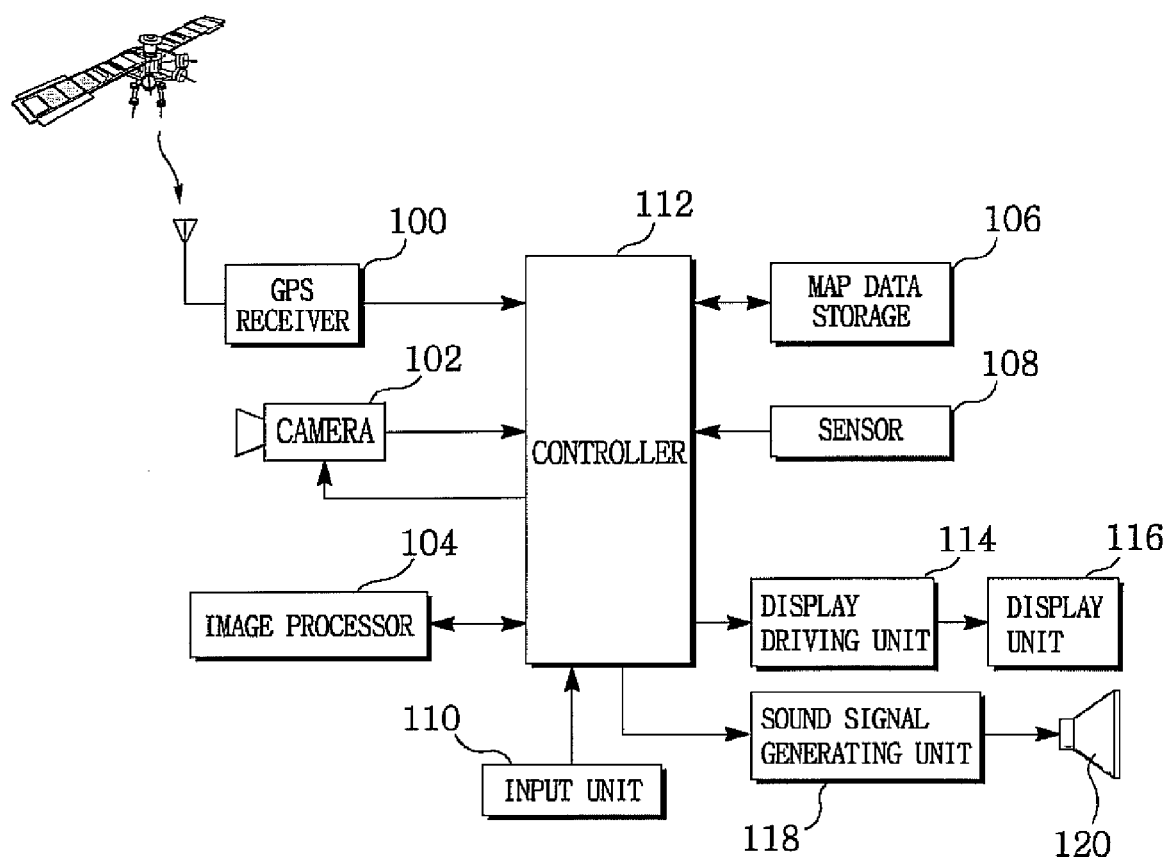
FIG. 1 is a block diagram illustrating a construction of a navigation system in accordance with one embodiment of the present invention.

FIG. 1 is a block diagram illustrating a construction of a navigation system in accordance with one embodiment of the present invention. Referring to FIG. 1, reference numeral 100 is a GPS receiver. The GPS receiver 100 receives navigation messages periodically transmitted by a plurality of GPS satellites, and uses the navigation messages to extract location coordinates.

Reference numeral 102 defines a camera for photographing objects, and reference numeral 104 denotes an image processor. The image processor 104 captures images of objects photographed by the camera 102 and performs image processing on the images, such as inserting text information into the captured images and inserting a guide object indicator.

Reference numeral 106 represents a map data storage in which map data is pre-stored. The map data in the map data storage 106 is stored with text information including location information of various display objects such as buildings, and text information such as building names of display objects.

Reference numeral 108 is a sensor. The sensor 108 is disposed with an inclination sensor for detecting inclinations and an azimuth angle sensor, such as a gyroscope, for detecting azimuth angles and inclinations of the camera 102.

Reference numeral 110 is an input unit. The input unit 110 is disposed with a plurality of functional keys. The input unit 110 generates a relevant operation command in response to a user's selective manipulation of the functional keys. That is, a user may manipulate the functional keys of the input unit 110 to input a matching command of objects, a guide command of a travel route, and a starting point and destination for guiding the travel route.

Reference numeral 112 defines a controller. The controller 112 controls the camera 102 in such a manner that the camera 102 may photograph predetermined objects. The controller 112 controls the image processor 104 in such a way that the image processor 104 captures images of the predetermined objects photographed by the camera 102 and processes the captured images. The controller 112 determines a current location of the camera 102 in response to an output signal of the GPS receiver 100, and determines the azimuth angles and inclinations of objects photographed by the camera 102 in response to a detection signal by the sensor 108. The controller 112 uses the azimuth angles and inclinations of the objects photographed by the camera 102 to match the objects to the display objects in the map data stored in the map data storage 106. The controller 112 reads out from the map data storage 106 the text information of the display objects matched to the objects, and controls in such a way that the read-out text information is inserted into a location of the matched relevant object in the photographed images. The controller 112 also searches for a travel route of a user and controls in such a manner that the user can be guided along the searched travel route.

Reference numeral 114 denotes a display driving unit. The display driving unit 114 displays on a display unit 116 the images of the objects photographed by the camera 102 and the text information in response to the control of the controller 112.

Reference numeral 118 is a sound signal generating unit. The sound signal generating unit 118 generates a sound signal for guiding a travel route of a user in response to the control of the controller 112, and outputs the generated sound signal to a speaker 120 to allow the user to listen to the sound.

In the navigation system thus constructed, if the objects of the images photographed by the camera 102 and the display objects of the map data stored in the map data storage 106 are matched, the controller 112 first operates the GPS receiver 100 to receive the navigation messages and to detect a current location, and then operates the camera 102 to photograph the predetermined objects. Furthermore, if the predetermined objects are photographed by the camera 102, the controller 112 controls the image processor 104 to capture the images photographed by the camera 102.

If the image processor 104 captures the images photographed by the camera 102, the controller 112 discriminates location information of the camera 102 by way of the output signal of the GPS receiver 100 and the detection signal of the sensor 108. That is, the controller 112 determines a current location of the camera 102 by way of the output signal of the GPS receiver 100, and determines an azimuth angle and inclination of the camera 102 by way of the detection signal of the sensor 108.

Accordingly, the current location just determined and the azimuth angle of the camera 102 is used to calculate respective location information of objects from the captured images. The calculated location information is corrected by inclination of the camera 102 to correctly calculate the respective location information of the objects.

The controller 112 reads from the map data storage 106 map data of a predetermined region that contains the current location of the camera 102, and matches the current location of the camera 102 to the read map data. The matched current location and the azimuth angle of the camera 102 are used to calculate location information of respective display objects such as buildings included in the map data.

The controller 112 compares the location information of the calculated objects with that of the display objects and matches the calculated objects to the display objects according to the comparison result. If the matching between the calculated objects and display objects is completed, the controller 112 reads the respective text information of the matched display objects. The read text information is inserted into the location of a relevant object of captured images captured by the image processor 104 according to the control of the controller 112. The captured images inserted with the text information are then outputted to the display unit 116 via the display driving unit 114 and are made to be displayed on the screen.

Preferably, the insertion location of the text information is discriminated by the insertion location of the respective text information. Furthermore, it is preferable that the respective text information be inserted and displayed at locations so that they do not overlap each other.

Figure 2:
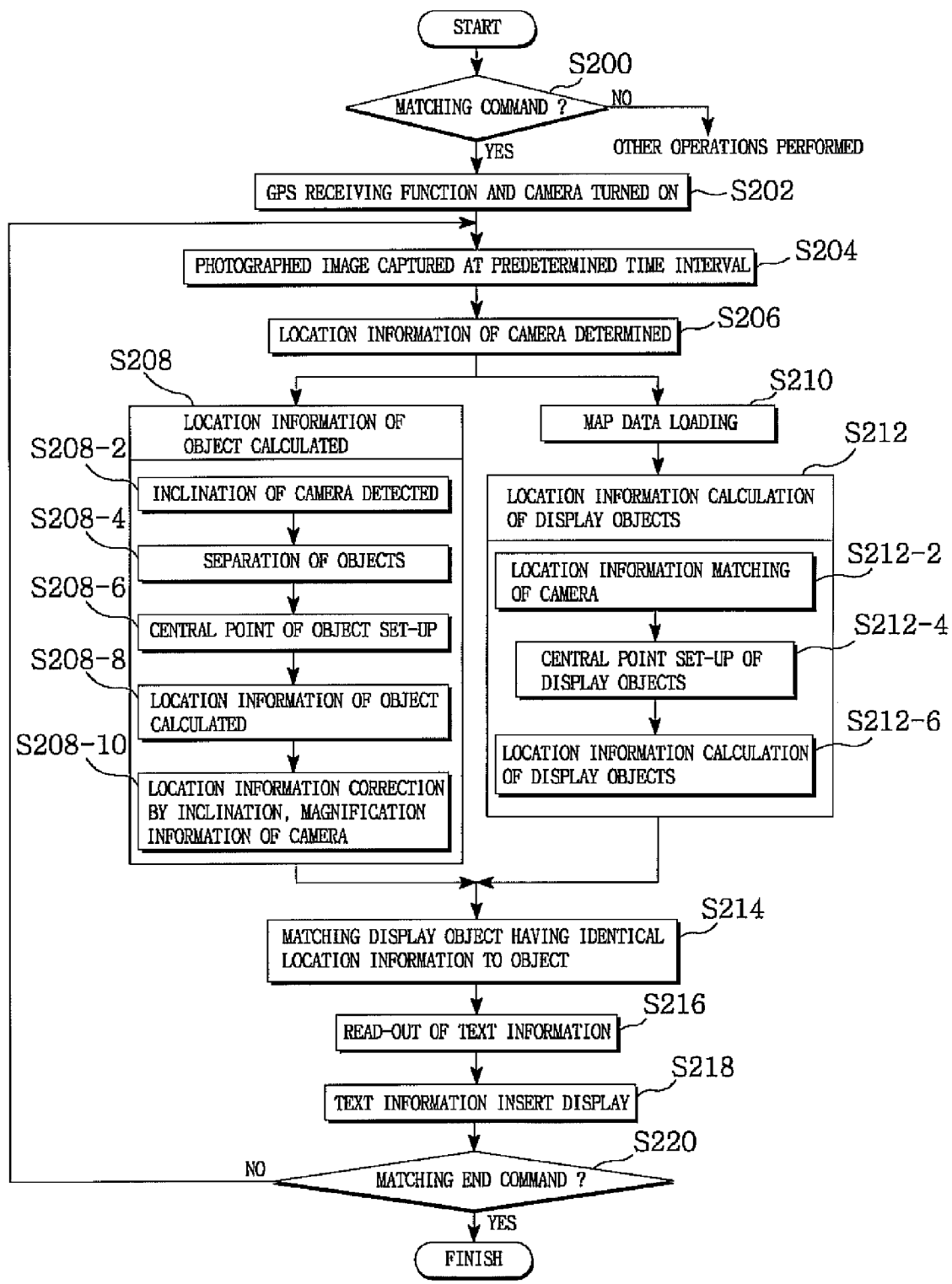
FIG. 2 is a signal flowchart illustrating an operation for displaying text information to locations of objects in accordance with one embodiment of the present invention.

FIG. 2 is a signal flowchart illustrating an operation for displaying text information to locations of objects in accordance with one embodiment of the present invention. Referring to FIG. 2, the controller 112 discriminates whether a matching command has been generated for matching a display object included in the map data to at least one object in the images photographed by the camera 102 (S200). The matching command may be personally given by a user manipulating the input unit 110. The matching command may be also generated by an information display of an object when the user manipulates the input unit 110 or by guidance of the travel route.

If the matching command is generated, the controller 112 operates the GPS receiver 100 and the camera 102 (S202), and controls the image processor 104 to allow the images photographed by the camera 102 to be captured at a predetermined time interval (S204).

The controller 112 determines the location information of the camera 102 that has photographed the objects (S206). Preferably, the controller 112 discriminates the current location calculated by the navigation messages received by the GPS receiver 100 as the current location of the camera 102. An azimuth angle of a central axis of the camera 102 is determined by an azimuth angle detected by an azimuth sensor such as a gyroscope disposed at the sensor 108.

If the location information of the camera 102 is determined, the controller 112 calculates location information of at least one object from the images captured by the image processor 104 (S208).

The calculation of the at least one object (S208) is performed in such a manner that first, inclination is determined by the camera 102 that has photographed the objects by way of a detection signal of the sensor 108 (S208-2). That is, the sensor 108 is equipped with an inclination sensor for detecting the inclination of the camera 102. Accordingly, the controller 112 determines the inclination of the camera 102 by the inclination detected by the inclination sensor of the sensor 108.

If the inclination of the camera 102 is determined, the controller 112 controls the image processor 104 to separate at least one object from the captured images (S208-4). Preferably, the image processor 104 extracts contours of respective objects from the captured images, and separates the at least one object using the extracted contours. The controller 112 then sets up a central point for extracting a location coordinate from the at least one object thus separated (S208-6). If the central point of the object is set up, the controller 112 calculates location information of a relevant object based on the current location and the azimuth angle of the camera 102 (S208-8).

Figure 3:
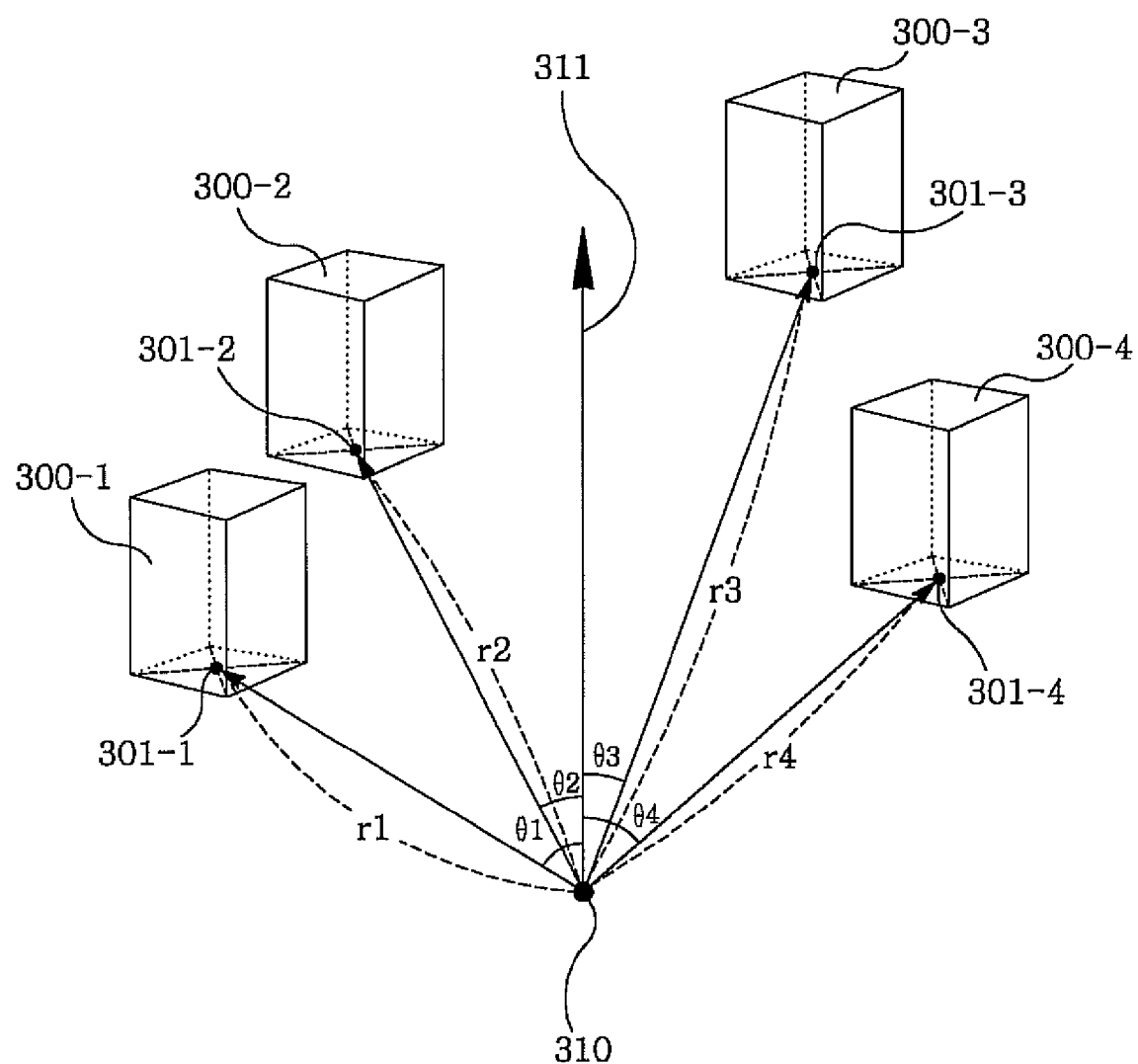
FIG. 3 is a schematic diagram illustrating an operation for calculating location information of objects in accordance with one embodiment of the present invention.

For example, if four objects (300-1 through 300-4) have been extracted from the images photographed by the camera 102, as illustrated in FIG. 3, bottom central points of respective objects (300-1 through 300-4) are set up as central points for extracting location information of relevant objects. Furthermore, the GPS receiver 100 calculates azimuth angles θ1, θ2, Θ3 and θ4, which are location information relative to central points (301-1 through 301-4) of the four objects (300-1-300-4). The GPS receiver 100 also calculates distances r1, r2, r3 and r4 based on an azimuth angle 311 of the central axis of the camera 102 discriminated by the detection signal of the sensor 108.

The distances r1, r2, r3 and r4 from a current location 310 of the camera 102 to the central points (301-1 through 301-4) of the four objects (300-1 through 300-4) vary depending on the inclination of the camera 102 and magnification information. Therefore, the distances r1, r2, r3 and r4 from the current location 310 of the camera 102 to the central points (301-1 through 301-4) of the four objects (300-1 through 300-4) are corrected by the inclination of the camera 102 detected by the sensor 108 and the magnification information by which the objects have been photographed by the camera 102 (S208-10 of FIG. 2). As a result, horizontal distances from the current location 310 of the camera 102 to the central points (301-1 through 301-4) of the four objects (300-1 through 300-4) can be accurately calculated.

Meanwhile, referring to FIG. 2, simultaneously with the calculation of the location information of the at least one object, the controller 112 loads map data stored in the map data storage 106. Preferably, based on a detected current location of the camera 102, the controller 112 loads the map data of a predetermined region from the map data storage 106 (S210). The controller 112 then calculates from the loaded map data, location information of a plurality of display objects, such as respective buildings based on the current location of the camera 102 (S212).

Preferably, the calculation (S212) of the location information relative to the plurality of display objects comprises matching the current location of the camera 102 to the map data (S212-2), setting up central points of each display object (S212-4), calculating distances from the determined current location of the camera 102 to the central points of each display object, and calculating azimuth angles of the central points of each display object based on the determined azimuth angle of the camera 102 (S212-6).

If the location information of the objects in the captured images and the location information of the display objects in the map data are calculated, the controller 112 compares the calculated location information of the at least one object with that of the display objects. Successively, a relevant display object is matched to the at least one object having the corresponding location information (S214).

Additionally, it is preferable to discriminate that an error value be set up in advance, the location information of the at least one object and that of the display objects included in the map data be compared, and a display object within the prior set-up error value be matched to the at least one object.

After the at least one object within the photographed images and the display object in the map data are matched, the controller 112 reads out from the map data storage 106 the text information of the display object matched to the at least one object (S216). The controller 112 then inserts the read-out text information into the captured image and displays it on a screen (S218). Preferably, the read-out text information of the display objects is respectively inserted into locations of matched relevant objects and is outputted to the display driving unit 114 for display on the screen of the display unit 116.

Figure 4:
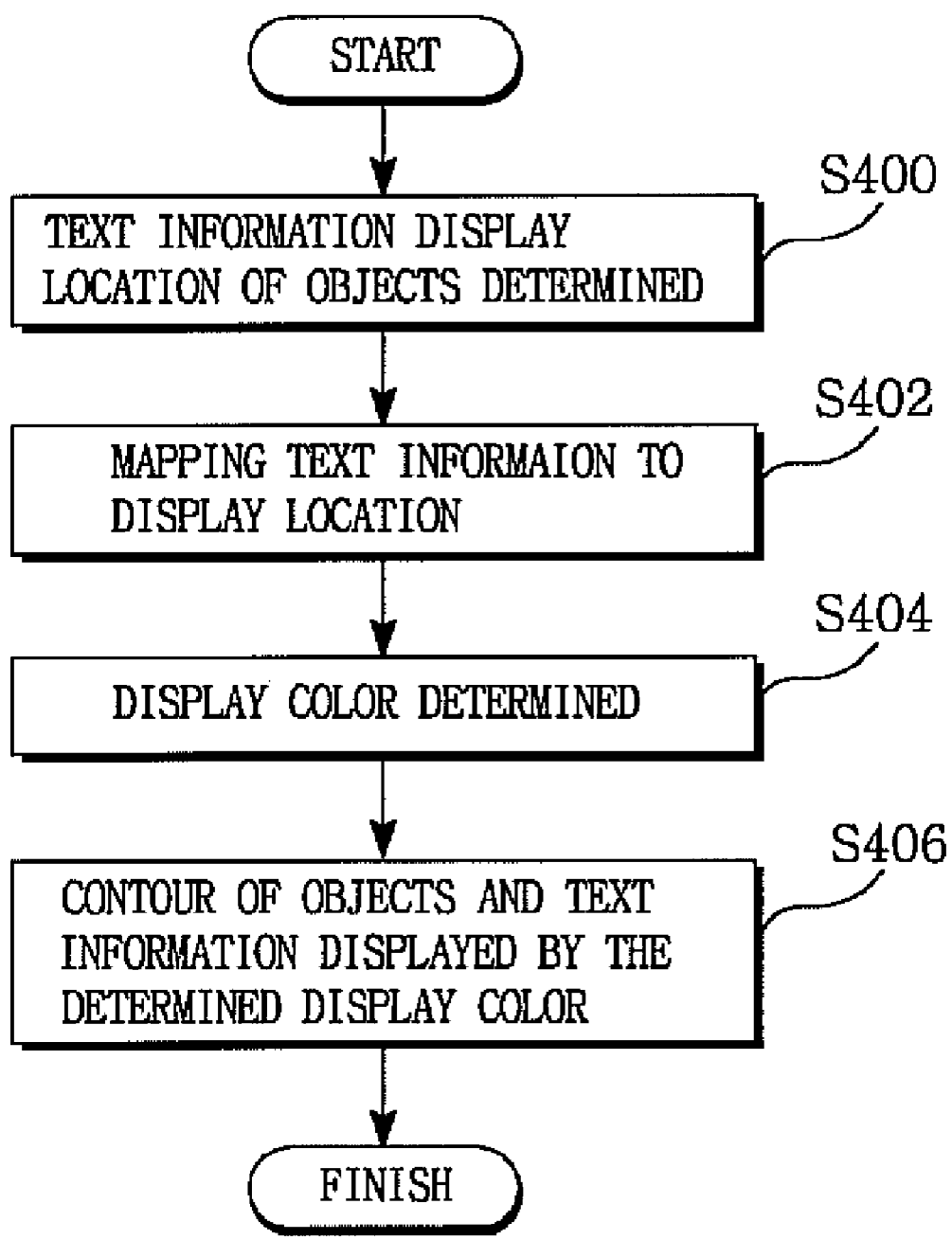
FIG. 4 is a signal flowchart illustrating an operation for displaying text information to locations of objects in accordance with one embodiment of the present invention.

In inserting the text information to the location of the at least one object matched to the display object and displaying it on the screen, the controller 112 first determines a display location where the text information is inserted into the at least one object matched to the display object (S400), as illustrated in FIG. 4. The display location may be determined at an upper position, an intermediate position or a lower position of the object where the text information is not overlapped. Once the display location of the text information is determined, the controller 112 maps the text information on a relevant display location (S402).

In order for a user to accurately check the text information of the at least one object in the present invention, the at least one object matched to the display object and display color of the text information are determined (S404), and the contour of the relevant object and the text information are displayed with the determined color (S406).

Figure 5:
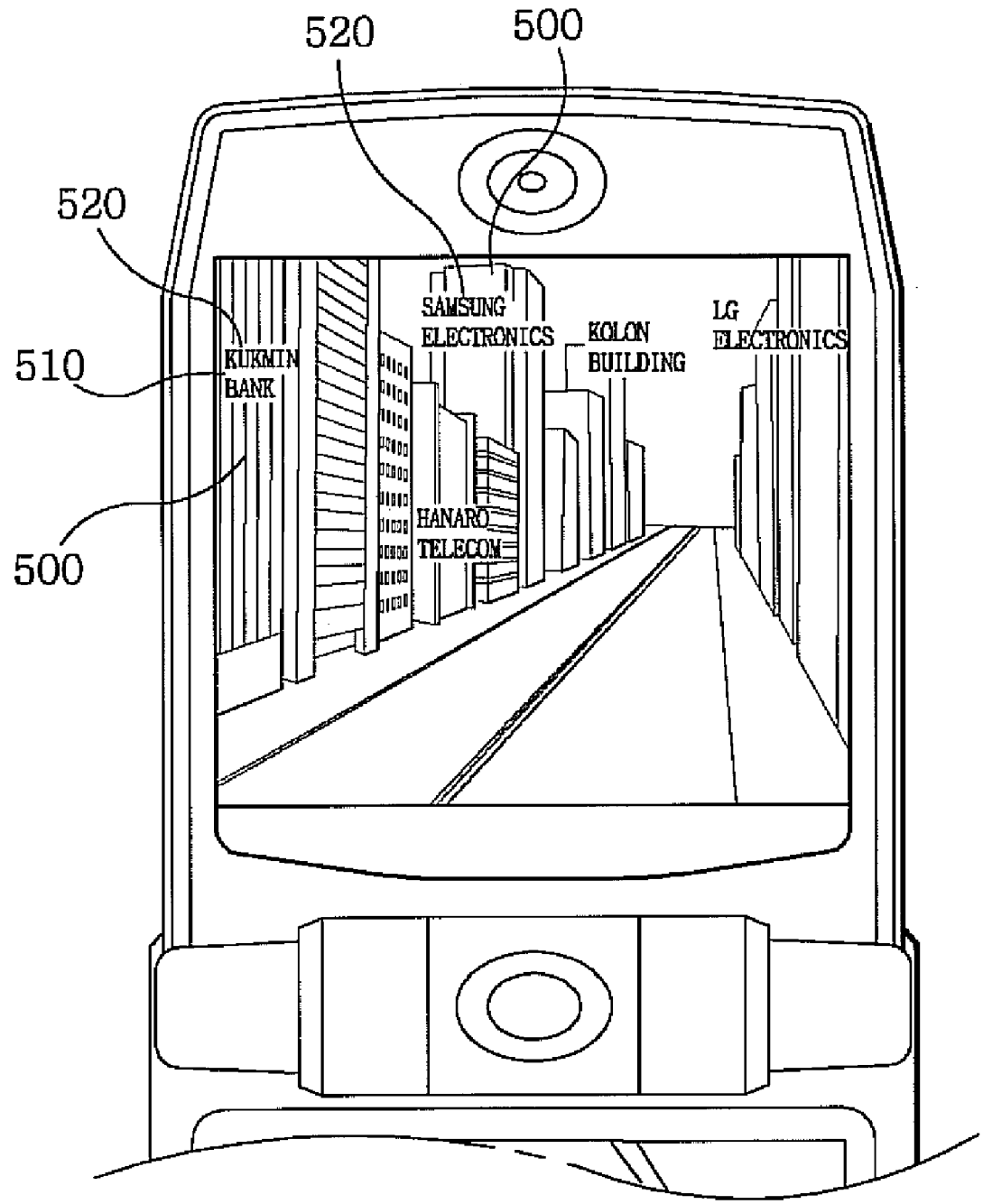
FIG. 5 is an example illustrating a case where text information is displayed to objects in accordance with one embodiment of the present invention.

For example, as illustrated in FIG. 5, the camera 102 is made to capture the photographed image, and the objects 500 within the captured image are made to be matched to the display objects in the map data. Display locations 510 for displaying the text information of the objects are determined, and text information 520 is inserted into the determined display locations 510 and displayed. Preferably, contour of the objects 500 and text information are displayed in the same color.

Following the displayed insertion of the text information into the locations of the objects in the image thus captured, the controller 112 discriminates whether a matching end command of the objects has been generated (S220 of FIG. 2). The matching end command may be produced by a user's manipulation of the input unit 110. The matching end command of the objects may be also generated when the guide of the travel route of the user is terminated.

Referring to FIG. 2, if a matching end command of the objects is not generated the controller 112 returns to the step S204 to capture the images photographed by the camera 102. Accordingly, the objects within the captured images and the display objects in the map data are matched, and operation of displaying the text information is repeatedly performed. If a matching end command is generated, the controller 112 terminates the operation of displaying the text information.

Meanwhile, if the travel route of the user is guided, the controller 112 first receives a starting point and a destination for guiding the travel route via the input unit 110. If the starting point and the destination for guiding the travel route are inputted, the controller 112 loads the map data stored in the map data storage 106, and uses the loaded map data to search for the travel route from the starting point to the destination.

If the travel route is searched, the controller 112 captures the images photographed by the camera 102 via the image processor 104 to match the objects in the images with the display objects included in the map data. Furthermore, the controller 112 displays the captured images on the screen of the display unit 116 to use the matched information between the objects and the display objects and to guide the travel route for the user.

Figure 6:
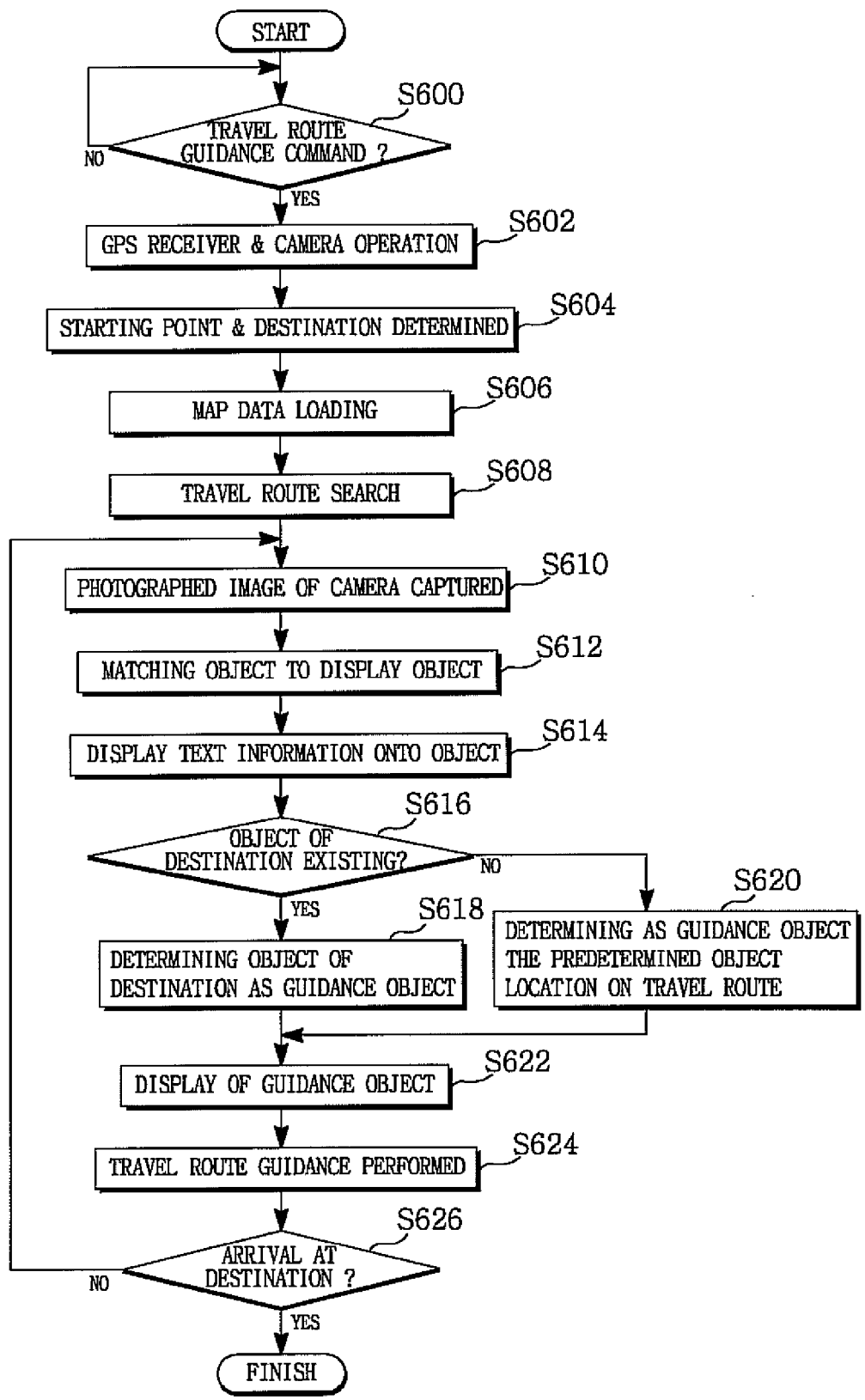
FIG. 6 is a signal flowchart illustrating an operation for guiding a travel route in accordance with one embodiment of the present invention.

Referring to FIG. 6, the controller 112 discriminates whether a guide command of the travel route is inputted from the input unit 110 (S600). If the guide command of the travel route is inputted, the controller 112 turns on the GPS receiver 100 and the camera 102 for normal operation (S602). The controller 112 then determines the starting point and the destination for guiding the travel route (S604).

Preferably, a location discriminated by the GPS receiver 100 that has received the navigation messages is determined as the starting point of the travel route if a current location is inputted by the input unit 110. If the user commands the guide of the travel route, the controller 112 loads the map data stored in the map data storage 106 to display the map data on the screen of the display unit 116, and the user can personally input the starting point and the destination via the map displayed on the display unit 116.

If the starting point and the destination are determined, the controller 112 extracts the map from the map data storage 106 (S606), and searches for an optimum travel route from the starting point to the destination using the extracted map data (S608). Preferably, an operation for searching the travel route is one of various searching operations known in the art.

If the travel route search is completed, the controller 112 controls the image processor 104 to capture the images photographed by the camera 102 at a predetermined time interval (S610), and matches the objects in the captured images with the display objects included in the map data (S612). The text information of the display objects matched with the objects is then read out from the map data of the map data storage 106, and the read-out text information is inserted into the captured images and displayed (S614).

Preferably, an operation for the matching between the objects in the captured images and the display objects included in the map data, and the display of the text information, are the same as in FIG. 3. Following the match between the objects and the display objects and display of the text information, the controller 112 discriminates whether an object having a destination in the captured image is available (S616).

If an object having a destination in the captured image is available, the controller 112 determines the object having the destination in the captured image as a guidance object (S618). If there is no object having a destination in the captured image, the controller 112 determines a predetermined object existing on the travel route as a guidance object (S620).

Once the guidance object is determined, the controller 112 inserts a guidance object indicator into a location of an object corresponding to the guidance object in the captured image, and the image inserted with the guidance object indicator is displayed on the display unit 116 via the display driving unit 114 for the user to check (S622).

Furthermore, the controller 112 uses the image displayed on the display unit 116 and the text information to guide the travel route of the user (S624). The controller 112 controls the sound signal generating unit 118 to generate a guide sound signal and outputs the generated sound signal to the speaker 120 so that the user can be guided on the travel route with the sound signal, if a direction change of the travel route or a guide of the guidance object are performed. Under this circumstance, the controller 112 discriminates whether the guide of the travel route to the destination has been completed (S626).

As a result of the discrimination, if the guide of the travel route to the destination has not been completed, the controller 112 captures the image photographed by the camera 102, and matches the objects in the captured image with the display object of the map data to set up a guidance object. The operation of inserting and displaying guidance object icons is then repeatedly performed. Preferably, the guidance object icons are differently displayed to enable the user to check whether the object determined as the guidance object is the destination or not the destination.

Figure 7A:
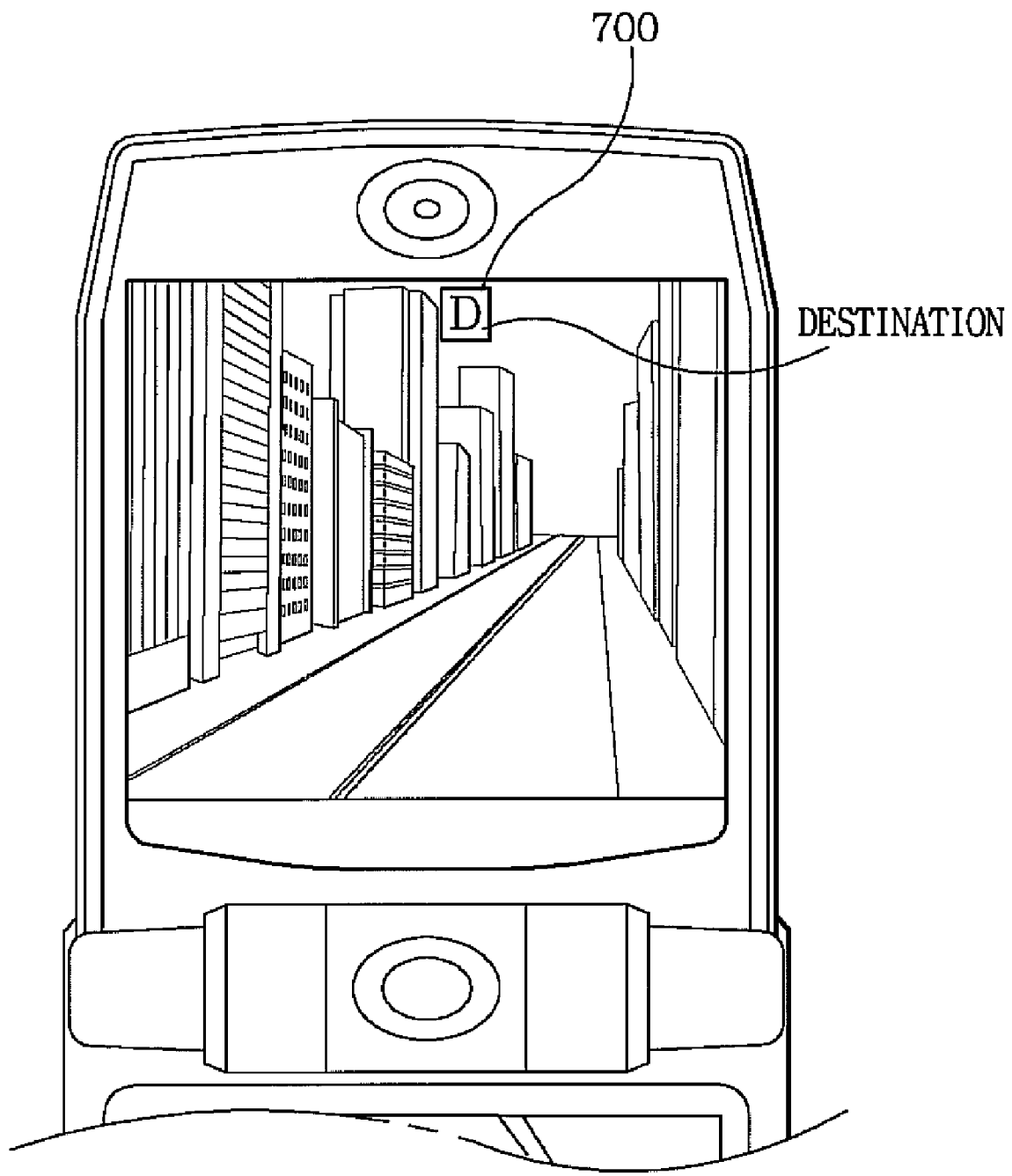
FIGS. 7a and 7b are examples illustrating operations for displaying guide object points on photographed images in accordance with one embodiment of the present invention.
Figure 7B:
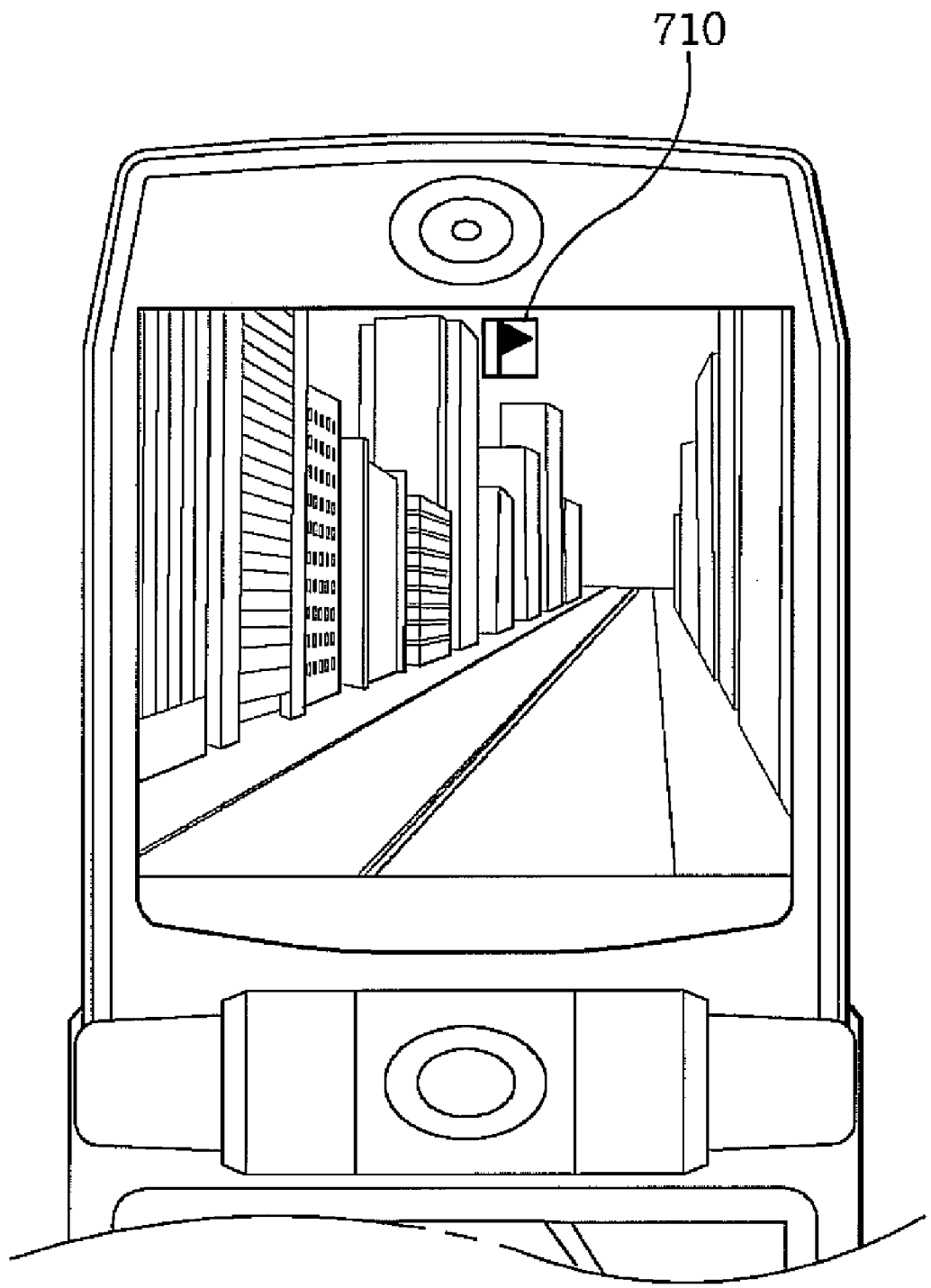

Preferably, if the object determined as the guidance object is the destination, a guidance object indicator 700 is displayed thereto, as illustrated in FIG. 7*a*. Preferably, if a predetermined object existing on the travel route is determined as the guidance object, a different guide object indicator 710 is displayed thereto, as illustrated in FIG. 7*b*.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method for matching a camera-photographed image with map data in a portable terminal, the method comprising:
   photographing at least one object with a camera;
   determining first location information of the camera photographing the at least one object;
   calculating second location information of the at least one object photographed using a location information calculation point located substantially at a center of the at least one object photographed;
   calculating third location information of at least one display object included in the map data stored in the portable terminal based on a current location of the camera;
   comparing the second location information to the third location information; and
   matching the at least one display object included in the map data stored in the portable terminal to the at least one object photographed based on the comparison.

2. The method of claim 1, wherein determining the first location information of the camera photographing the at least one object comprises:
   determining the current location of the camera according to GPS messages received by a GPS receiver disposed on the portable terminal;
   determining an azimuth angle of a central axis of the camera using an azimuth sensor disposed on the portable terminal; and
   determining an inclination of the camera using an inclination sensor disposed on the portable terminal.

3. The method of claim 1, wherein the second location information of the at least one object photographed and the third location information of the at least one display object are calculated from the determined first location information of the camera based on the current location of the camera and an azimuth angle of a central axis of the camera.

4. The method of claim 1, wherein the first location information of the camera comprises the current location of the camera and an azimuth angle of a central axis of the camera.

5. The method of claim 4, wherein calculating the second location information of the at least one object photographed comprises:
   extracting a contour from the at least object photographed;
   establishing the location information calculation point of the at least one object photographed from the extracted contour;
   calculating an azimuth angle of the location information calculation point of the at least one object photographed based on the azimuth angle of the central axis of the camera; and
   calculating a distance from the current location of the camera to the location information calculation point of the at least one object photographed.

6. The method of claim 5, wherein extracting the contour from the at least one object photographed is performed by capturing the at least one object photographed.

7. The method of claim 4, wherein the first location information of the camera further comprises an inclination of the camera.

8. The method of claim 5, wherein calculating the second location information of the at least one object photographed further comprises correcting the calculated distance from the current location of the camera to the location information calculation point of the at least one object photographed.

9. The method of claim 1, wherein calculating the third location information of at least one display object based on the current location of the camera comprises:
   matching the first location information of the camera to the map data;
   establishing a location information calculation point of the at least one display object; and
   calculating location information of the location information calculation point of the at least one display object based on the location of the camera matched to the map data.

10. The method of claim 9, wherein the first location information of the camera comprises the current location of the camera and an azimuth angle of a central axis of the camera.

11. The method of claim 9, wherein calculating the location information of the location information calculation point of the at least one display object comprises:
    calculating a distance from the current location of the camera to the location information calculation point of the at least one display object; and
    calculating an azimuth angle of the location information calculation point of the at least one display object based on the azimuth angle of the central axis of the camera.

12. The method of claim 1, wherein matching the at least one display object to the at least one object photographed is performed when an error value between the second location information of the at least one object photographed and the third location information of the at least one display object is within a predetermined value.

13. The method of claim 1, further comprising:
    reading-out text information of the at least one display object matched to the at least one object photographed from the map data;
    inserting the text information into relevant locations within the at least one object photographed; and
    displaying the at least one object photographed having the text information inserted therein.

14. The method of claim 13, wherein inserting the text information into the relevant locations within the at least one object photographed comprises:
- determining a display location of the text information at a location of the at least one object photographed matched to the at least one display object; and
- mapping the text information of the at least one display object at the determined display location.

15. The method of claim 13, wherein displaying the at least one object photographed having the text information inserted therein comprises:
- determining a display color; and
- displaying a contour of the at least one object photographed and the text information by the determined display color.

* * * * *